United States Patent
Kelton et al.

(10) Patent No.: US 9,655,069 B2
(45) Date of Patent: May 16, 2017

(54) DYNAMIC TRANSMITTER CALIBRATION

(75) Inventors: James Robert Kelton, Austin, TX (US); Michael David Cave, Austin, TX (US)

(73) Assignee: ViXS Systems, Inc., Toronto, Ontario (CA)

( * ) Notice: Subject to any disclaimer, the term of this patent is extended or adjusted under 35 U.S.C. 154(b) by 416 days.

(21) Appl. No.: 13/228,547

(22) Filed: Sep. 9, 2011

(65) Prior Publication Data
US 2013/0065544 A1 Mar. 14, 2013

(51) Int. Cl.
*H04W 52/52* (2009.01)
*H04W 52/24* (2009.01)
*H04W 52/36* (2009.01)

(52) U.S. Cl.
CPC ......... *H04W 52/52* (2013.01); *H04W 52/241* (2013.01); *H04W 52/243* (2013.01); *H04W 52/367* (2013.01)

(58) Field of Classification Search
CPC H04B 17/0025; H04B 17/001; H04B 1/0475; H04B 2001/0425; H04B 2001/0433; H04B 2001/0416; H04B 17/13; H04B 17/354; H04B 17/336; H03F 1/3247; H04L 27/367
(Continued)

(56) References Cited

U.S. PATENT DOCUMENTS 5,524,285 A * 6/1996 Wray ..................... H03F 1/3247
330/149

6,476,677 B1 * 11/2002 Komaili ................. H03F 1/3241
330/279
(Continued)

FOREIGN PATENT DOCUMENTS

GB 2293509 A 3/1996
GB 2323987 A 10/1998
(Continued)

OTHER PUBLICATIONS

Zander, Jens, "Transmitter Power Control for Co-channel Interference Management in Cellular Radio Systems," Proc. 4th WINLAB Workshop, 1993, 15 pages.
(Continued)

*Primary Examiner* — Devan Sandiford
(74) *Attorney, Agent, or Firm* — Zagorin Cave LLP

(57) ABSTRACT

A method includes generating an indicator of interference introduced by a transmitter into a spectrum of an output transmit signal outside a target channel of the transmitter. The indicator is generated based on the output transmit signal. The method includes adjusting a power level of the output transmit signal based on the indicator and a predetermined interference indicator level. The indicator may indicate a carrier-to-interference (C/I) ratio of the output transmit signal, and the adjusting comprises setting the power level of the output transmit signal to a maximum power level that maintains the C/I ratio of the output transmit signal above the predetermined interference indicator level. The output transmit signal may be based on a radio-frequency output of a power amplifier of the transmitter prior to transmission over a channel and the generating comprises generating a baseband version of the output transmit signal.

30 Claims, 8 Drawing Sheets

(58) Field of Classification Search
USPC .......................................... 455/114.2, 114.3
See application file for complete search history.

(56) References Cited

U.S. PATENT DOCUMENTS

| | | | | |
|---|---|---|---|---|
| 6,621,340 | B1* | 9/2003 | Perthold | H03F 1/3241 330/129 |
| 6,993,296 | B2* | 1/2006 | Leyh et al. | 455/78 |
| 7,113,551 | B2* | 9/2006 | Sills et al. | 375/297 |
| 7,363,008 | B2* | 4/2008 | Hassan et al. | 455/63.1 |
| 7,634,290 | B2 | 12/2009 | Kelton et al. | |
| 7,848,717 | B2* | 12/2010 | Liu | 455/114.3 |
| 7,899,429 | B2* | 3/2011 | Rofougaran | 455/313 |
| 7,944,295 | B2* | 5/2011 | Hongo et al. | 330/149 |
| 8,818,305 | B1* | 8/2014 | Schwent | H03F 1/0227 330/127 |
| 2002/0008579 | A1* | 1/2002 | Mucenieks | H03F 1/3229 330/149 |
| 2003/0086398 | A1 | 5/2003 | Hiltunen | |
| 2004/0102207 | A1* | 5/2004 | Wenzel | H03G 3/3047 455/522 |
| 2004/0152429 | A1* | 8/2004 | Haub et al. | 455/102 |
| 2004/0176039 | A1* | 9/2004 | Leyh et al. | 455/67.11 |
| 2004/0212428 | A1 | 10/2004 | Ode et al. | |
| 2005/0026564 | A1* | 2/2005 | Haub et al. | 455/67.11 |
| 2005/0133467 | A1* | 6/2005 | Trachewsky | H03G 3/3047 210/803 |
| 2005/0143115 | A1* | 6/2005 | Hiddink | H04W 52/267 455/522 |
| 2005/0213685 | A1* | 9/2005 | Takabayashi | H03F 1/3247 375/296 |
| 2006/0030286 | A1* | 2/2006 | Haub et al. | 455/295 |
| 2006/0040617 | A1* | 2/2006 | Haub et al. | 455/67.13 |
| 2007/0015474 | A1* | 1/2007 | Heinikoski | H03F 1/3241 455/126 |
| 2008/0049672 | A1* | 2/2008 | Barak et al. | 370/330 |
| 2008/0106333 | A1* | 5/2008 | Liu | H03F 1/3241 330/149 |
| 2008/0260065 | A1* | 10/2008 | Ojard | 375/295 |
| 2009/0033418 | A1* | 2/2009 | Ericson | H03F 1/3247 330/149 |
| 2009/0227216 | A1* | 9/2009 | Lozhkin | 455/114.3 |
| 2010/0248658 | A1* | 9/2010 | Pratt | H03F 1/3247 455/114.3 |
| 2011/0074506 | A1* | 3/2011 | Kleider | H03F 1/3294 330/149 |
| 2012/0081178 | A1* | 4/2012 | Shi | H03F 1/3247 330/149 |

FOREIGN PATENT DOCUMENTS

GB 2369734 A 6/2002
WO WO03105336 A1 12/2003

OTHER PUBLICATIONS

European Search Report in Application No. 12182479.1, Feb. 4, 2013, 6 pages.

* cited by examiner

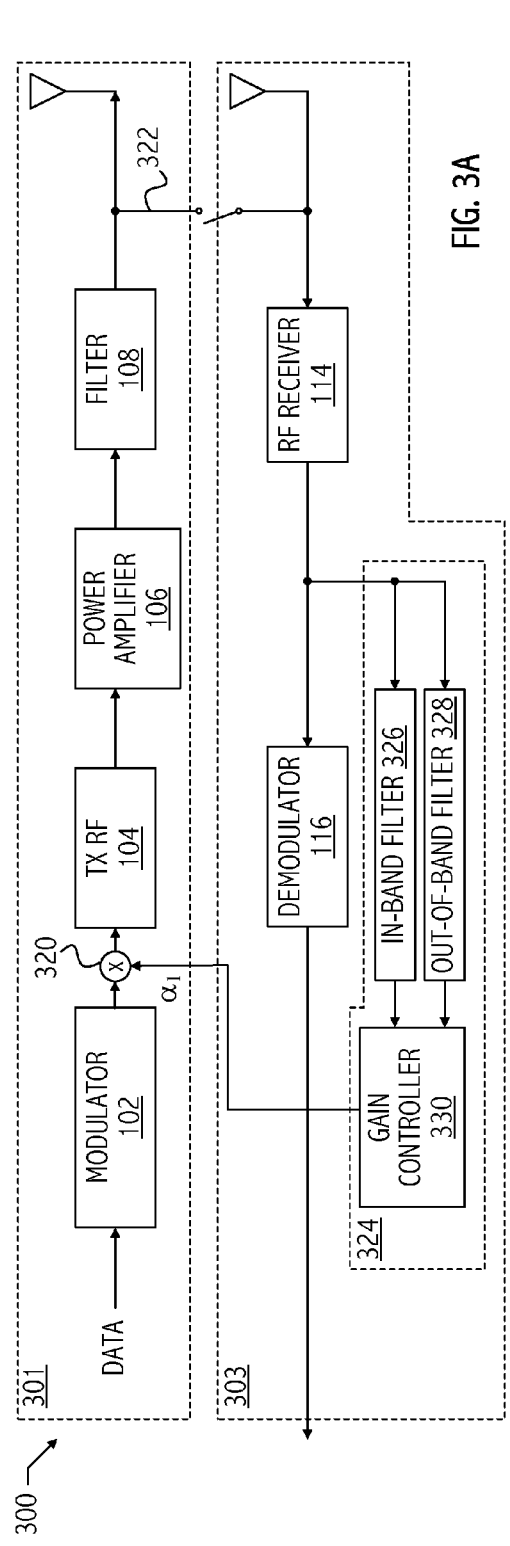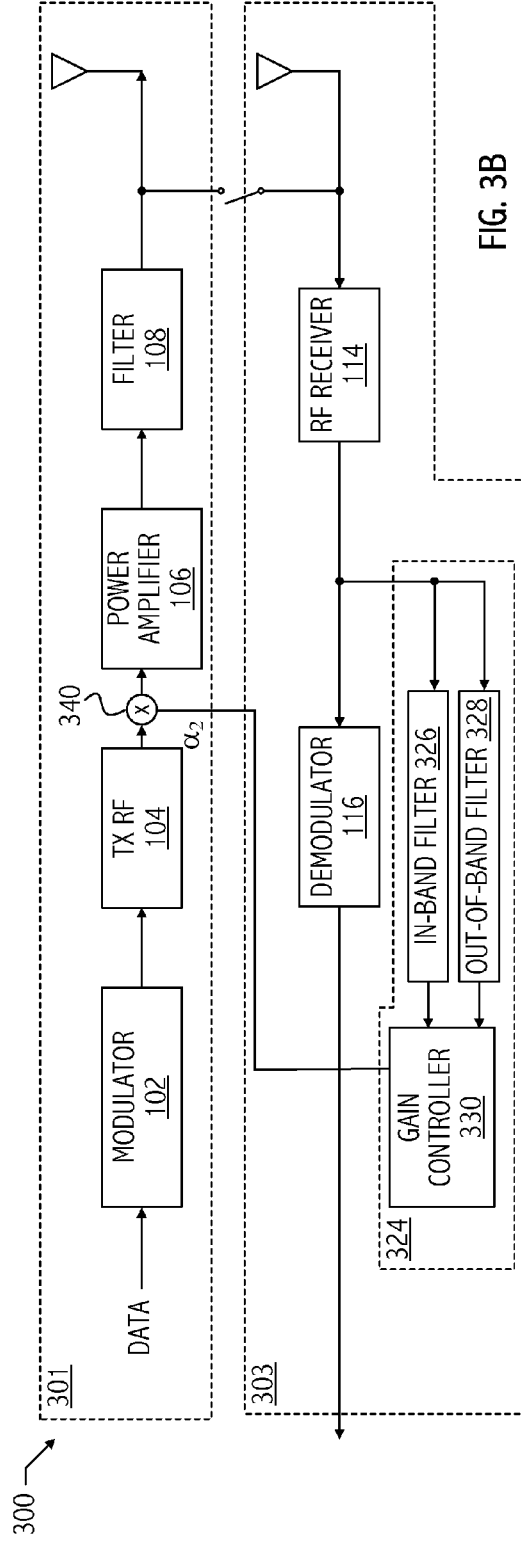

DYNAMIC TRANSMITTER CALIBRATION

BACKGROUND

Field of the Invention

This invention relates to communications systems and more particularly to managing interference associated with communications systems.

Description of the Related Art

In a typical radio frequency (RF) communications system, a transmitter generates a relatively high-power radio-frequency signal carrying information received from an input data signal. A typical RF transmitter includes a modulator, an RF mixer (i.e., RF modulator), and a power amplifier. The modulator converts digital data from the input signal into an analog waveform, typically a baseband signal, although not limited thereto. The RF mixer translates the center frequency of the baseband signal to a target RF frequency. The power amplifier boosts the power of the signal for transmission by an antenna over the channel (e.g., over-the-air).

In practice, the typical transmitter does not produce a completely bandlimited signal. As referred to herein, a "bandlimited" signal is a signal that has energy only in a target frequency band of the channel. In general, the target frequency band and other frequency bands are separated by a guard band, which in typical orthogonal frequency division multiplexing (OFDM) transmitters is included as part of the target frequency band, but is not allocated any data. Energy that is transmitted outside the target frequency band is referred to as "out-of-band" energy. In general, out-of-band energy causes interference with other channels (e.g., adjacent channels or alternate adjacent channels) and limits the performance of other communications systems operating in proximity to the radio-frequency communications system. To manage the amount of out-of-band energy and interference between proximate communications systems, communications standards define spectral masks that transmitted signals must satisfy to be compliant with the communications standard. A typical communications standard for RF communications systems specifies a spectral mask that defines characteristics of in-band signals for a target communications channel based on a frequency band having a particular center frequency and a particular bandwidth. The spectral mask also defines characteristics for out-of-band signals (e.g., how energy transmitted outside the defined communications channel is to be attenuated as a function of frequency).

In actual communications systems, the modulator, RF mixer, and power amplifier each introduce out-of-band energy. However, the power amplifier is typically the limiting factor in the RF transmitter. In general, tolerable levels of distortion, which are specified by an applicable communications standard, determine the maximum output power deliverable by the power amplifier. Manufacturing tolerances cause power amplifiers to have different gains and different levels of distortion at the same output power level. In addition, during transmitter operation, gain and distortion levels may change in response to increase in temperature due to power dissipation of the transmitter. Accordingly, the transmitter of an actual communications system is not typically configured to operate at a maximum output power at which the target distortion levels are just reached. Instead, the transmitter may be configured to generate transmit signals having a power level that has substantial margin below the distortion limits. For example, the output power may be set at 5 decibels (dB) or more below a maximum transmitter output power at which the target distortion levels are just reached. Another technique for setting the output power of a transmitter includes calibrating each individual transmitter, which introduces additional costs into the end product. For example, calibration requires time to obtain calibration data and non-volatile memory to store the calibration data. In addition, calibration techniques that account for temperature variation are limited.

SUMMARY

In at least one embodiment of the invention, a method includes generating an indicator of interference introduced by a transmitter into a spectrum of an output transmit signal. The indicator is generated based on the output transmit signal. The method includes adjusting a power level of the output transmit signal based on the indicator and a predetermined interference indicator level. In at least one embodiment of the method, the indicator indicates a carrier-to-interference (C/I) ratio of the output transmit signal, and the adjusting comprises setting the power level of the output transmit signal to a maximum power level that maintains the C/I ratio of the output transmit signal above the predetermined interference indicator level. In at least one embodiment of the method, the output transmit signal is based on a radio-frequency output of a power amplifier of the transmitter prior to transmission over a channel and the generating comprises generating a baseband version of the output transmit signal.

In at least one embodiment of the invention, an apparatus includes a filter module configured to generate an indicator of an out-of-band power level of an output transmit signal generated by a transmitter. The apparatus includes a gain control module configured to generate a transmitter gain control signal based on the out-of-band power level indicator and a predetermined interference indicator level. In at least one embodiment of the apparatus, the filter module includes an in-band filter and an out-of-band filter configured to generate the indicator based on a baseband version of the output transmit signal.

In at least one embodiment of the invention, a tangible computer-readable medium encodes a representation of a circuit that includes a filter module configured to generate an indicator of an out-of-band power level of an output transmit signal generated by a transmitter. The circuit includes a gain control module configured to generate a transmitter gain control signal based on the out-of-band power indicator and a predetermined interference indicator level.

BRIEF DESCRIPTION OF THE DRAWINGS

The present invention may be better understood, and its numerous objects, features, and advantages made apparent to those skilled in the art by referencing the accompanying drawings.

FIGS. 3A, 3B, 3C, 3D, and 3E illustrate functional block diagrams of radio-frequency communications units configured for dynamic transmitter power calibration consistent with various embodiments of the invention.

The use of the same reference symbols in different drawings indicates similar or identical items.

DETAILED DESCRIPTION

Figure 1:
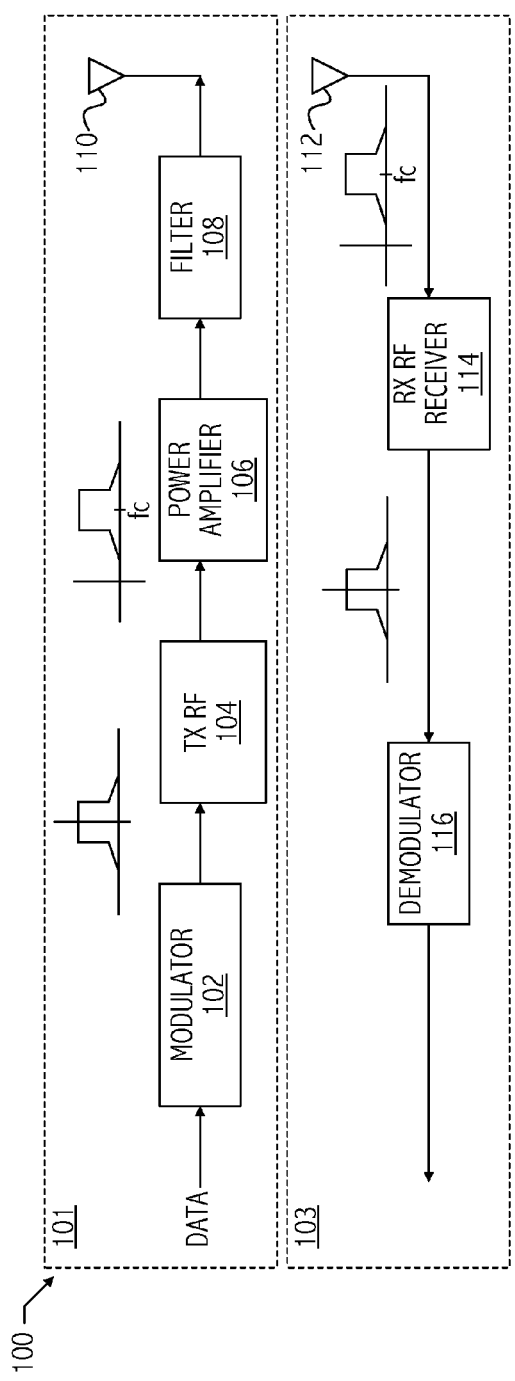
FIG. 1 illustrates a functional block diagram of an exemplary radio-frequency communications unit of an exemplary communications system.

Referring to FIG. 1, an exemplary half-duplex or simplex communications system includes at least two units: a unit including a transmitter and a unit including a receiver, although each unit (e.g., communications unit 100) typically includes both a transmitter (e.g., transmitter 101) and a receiver (e.g., receiver 103). In at least one embodiment, transmitter 101 includes a modulator (e.g., modulator 102), and transmitter radio frequency module (e.g., TX RF mixer 104), a power amplifier (e.g., power amplifier 106), and an antenna (e.g., antenna 110). In at least one embodiment, transmitter 101 includes a filter (e.g., filter 108), which has a response that blocks out-of-band signals at frequencies far away from the frequencies of the target channel. In at least one embodiment, receiver 103 includes an antenna (e.g., antenna 112), a receiver radio-frequency converter (e.g., RX RF receiver 114), and a demodulator (e.g., demodulator 116).

In at least one embodiment of transmitter 101, modulator 102 receives a data stream and generates a baseband carrier signal containing representations of the data while introducing only low levels of distortion. In at least one embodiment, modulator 102 implements quadrature amplitude modulation (QAM, e.g., 16-QAM or 64-QAM), binary phase-shift keying (BPSK), quadrature PSK (QPSK), or other suitable modulation technique. In at least one embodiment, modulator 102 implements orthogonal frequency division multiplexing (OFDM) and each OFDM subcarrier is modulated using QAM (e.g., 16-QAM or 64-QAM), BPSK, QPSK, or other suitable modulation technique. In at least one embodiment of transmitter 101, TX RF mixer 104 shifts the baseband signal to a higher frequency channel (i.e., a channel centered around a radio frequency center frequency, $f_c$, e.g., approximately 2.4 GHz or approximately 5 GHz). Modulator 102 and TX RF mixer 104 generate a signal having spectral content that is substantially limited to the bandwidth of the target channel (i.e., the signal is substantially bandlimited, e.g., having a bandwidth of approximately 20 MHz). Note that in other embodiments of transmitter 101, the modulation and RF conversion are integrated in an RF modulator module that generates a substantially bandlimited RF signal.

In at least one embodiment of transmitter 101, power amplifier 106 increases the power level of the RF signal and in the process introduces substantial distortion and/or out-of-band energy into the signal. In at least one embodiment of transmitter 101, filter 108 blocks out-of-band signals at frequencies far removed from the target frequency band of the RF signal. Antenna 110 radiates the signal over the air. Although system 100 is an RF system, in other embodiments of a communications system consistent with techniques described herein, a signal is transmitted over other media, e.g., coaxial cable, power cable, or twisted pair cable.

To be compliant with a particular communications standard (e.g., Institute of Electrical and Electronics Engineers Standard for Information Technology 802.11n), transmitter 101 is required to generate output signals in a predetermined frequency band or channel and the output of power amplifier 106 should be an accurate reproduction of the radio-frequency signal input to the power amplifier. Thus, in at least one embodiment, power amplifier 106 is designed to be as linear as possible. In general, a linear system is a system that generates an output Y1 in response to an input X1, produces an output Y2 in response to an input X2, and produces an output Y1+Y2 in response to an input X1+X2. One implication of linearity is that the output does not contain any frequency components that do not exist at the input. However, in at least one embodiment, power amplifier 106 is a transistor amplifier. Since transistors are inherently nonlinear devices, it is difficult to realize a power amplifier that is completely linear. However, the input-to-output characteristics of power amplifier 106 operating at a particular frequency may be modeled using a Taylor series expansion as follows:

$$y = \sum_{n=0}^{\infty} a_n \times x^n.$$

In most cases $\alpha_n$ is a decreasing sequence of the odd harmonics for semiconductors. However, as the signal level increases, the higher powers of x grow faster than the desired linear term $\alpha_1 \times x$. Therefore, at small signal levels, power amplifier 106 tends to be substantially linear. As the signal level increases, the higher powers of x become more significant and the power amplifier increasingly deviates from ideal linear behavior.

Figure 2:
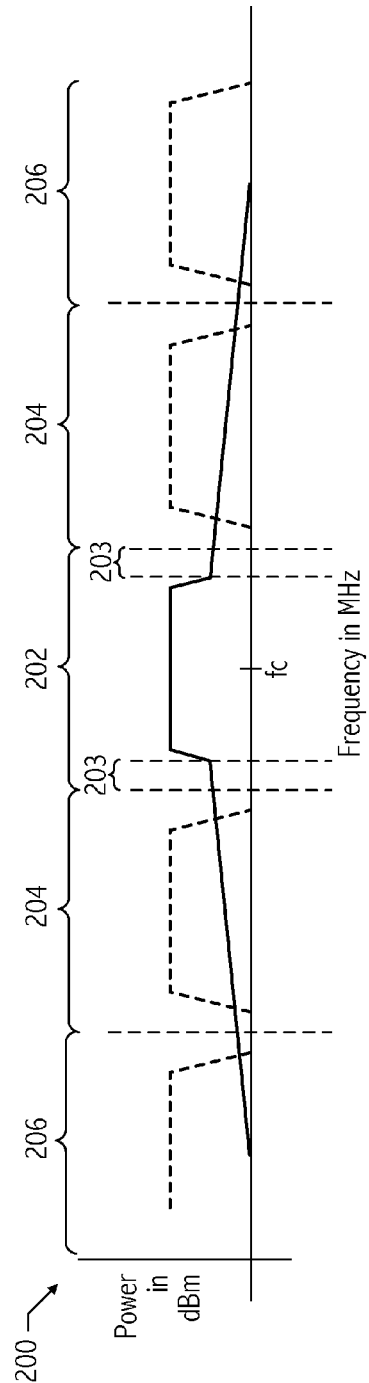
FIG. 2 illustrates exemplary power spectral density for various channels associated with an exemplary communications system.

Referring to FIG. 2, the non-linear distortions due to contributions to the spectrum (i.e., spectral density, power spectral density (PSD), or energy spectral density) modeled by the higher power terms of the series expansion result in two significant types of impairments in response to a signal that occupies a substantial portion of the target channel. A first type of impairment causes signal distortion within the target signal bandwidth (e.g., within region 202). That type of impairment reduces a carrier-to-interference (C/I) ratio of the signal. A second type of impairment causes distortion outside of the signal bandwidth (e.g., energy outside of region 202 in adjacent channel(s) 204 and/or alternate adjacent channel(s) 206) and results in adjacent channel interference and/or alternate adjacent channel interference. As referred to herein, an adjacent channel is a channel on either side of a target channel that is closest in frequency to the target channel. As referred to herein, an alternate channel is at least one channel more removed from the adjacent channel. A typical receiver captures a representation of the signal transmitted by another unit and recovers an estimate of the input data signal from this representation. In order to accurately recapture the input data signal and provide a target performance level for the communications system, signal distortion within the target signal bandwidth must be maintained below a particular threshold. For example, the carrier-to-interference (C/I) ratio must be maintained above a particular threshold. In addition, out-of-band energy (e.g., adjacent channel interference and/or alternate adjacent channel interference) must be maintained below a particular threshold. Although those two types of distortion are not actually caused by different mechanisms, they have different effects on communications systems performance and are addressed separately.

For example, a reduction of the C/I ratio for a signal is similar to the addition of noise into the signal (e.g., signal within region 202), which contains desired data. For the communications system to operate at a particular performance level, the C/I ratio must be maintained above a particular threshold level. In contrast, adjacent channel interference and alternate adjacent channel interference degrades the performance of other communications systems operating nearby using adjacent channels (e.g., channels 204) and/or alternate adjacent channels (e.g., channels 206) and are typically specified as maximum interference levels for a particular communications system. The distortion introduced by transmitter 101 typically must satisfy multiple ones of those constraints.

Referring to FIGS. 3A-3E, a communications unit (e.g., communications unit 300) implements a technique for dynamic transmitter calibration that configures the output power level of a transmit signal generated by a communications system based on one or more interference level indicators. The technique includes generating indicators of distortion generated by the transmitter during steady-state communications and dynamically adjusting the transmit output power level to maintain operation at a power level that satisfies one or more predetermined interference limits.

In at least one embodiment, communications unit 300 includes a receiver (e.g., receiver 303) configured to receive a signal on the same channel as transmitter 301 transmits. In at least one embodiment, communications unit 300 inherently allows such reception (e.g., by coupling between traces on a printed circuit board including transmitter 301 and receiver 303). In at least one embodiment, communications unit 300 includes a path (e.g., loopback path 322) that is configured to feedback the output transmit signal from a node of the transmitter prior to the transmission medium to receiver 303. In at least one embodiment of communications unit 300, the feedback signal is a version of the transmit signal that has not been transmitted over the channel, but has been processed by power amplifier 106.

In at least one embodiment of communications unit 300, an RF receiver module (e.g., RF receiver 114) frequency mixes the RF feedback signal to a baseband signal. FIG. 4 illustrates an exemplary RF receiver, which includes a low-noise amplifier, automatic gain control, and an RF frequency mixer. Referring back to FIGS. 3A-3E, demodulator 116 recovers digital data from the baseband signal provided by RF receiver 114. In at least one embodiment of receiver 303, a selective filter module (e.g., in-band filter 326 and out-of-band filter 328) determines the power level of the baseband signal that is inside the target channel. In addition, the selective filter module generates an indicator of a level of signal power at a frequency adjacent to the target channel or at a frequency in a guard band that is included as part of the target channel (e.g., the highest frequencies and/or lowest frequencies of the target channel, for example frequencies 203 of target channel 202 of FIG. 2), but is not allocated any signal by the transmitter. Note that although the invention has been described with reference to wireless communications of radio frequency transmitters that include the guard band as part of the target frequency band, techniques described herein apply to other transmitter embodiments that have a separate guard band between the target channel and next adjacent channels or exclude a guard band altogether. Since no signal is intentionally present in the adjacent channel or guard band, the power level at one or more frequencies in the adjacent channel or guard band represents a level of distortion and noise. For a typical operational range of a communications unit, the distortion of power amplifier 106 dominates this estimate. For at least one embodiment of power amplifier 106, the distortion level at any one frequency can be used to determine the distortion level at any other frequency. Thus, the indication of the distortion level in a guard band frequency or an out-of-band frequency can be used to determine the distortion energy level in any other frequency, including the target channel, an adjacent channel or alternate adjacent channel.

Figure 5A:
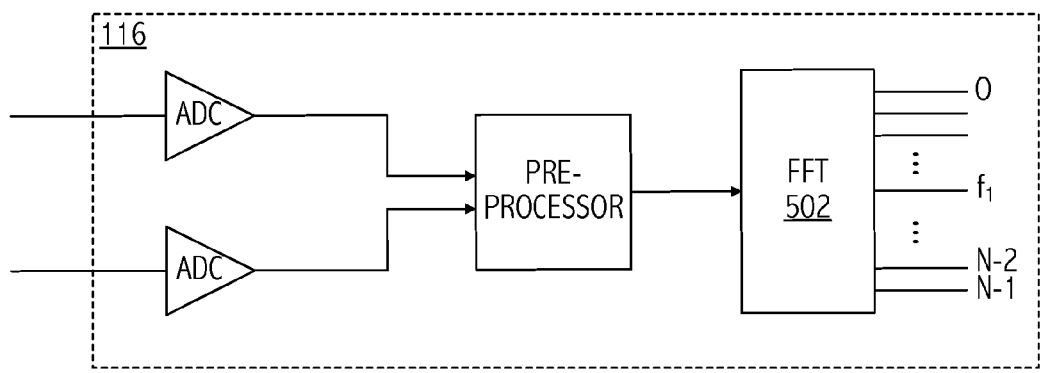
FIG. 5A illustrates a functional block diagram of a filter module of a radio-frequency transmitter module configured for dynamic transmitter power calibration consistent with various embodiments of the invention.
Figure 5B:
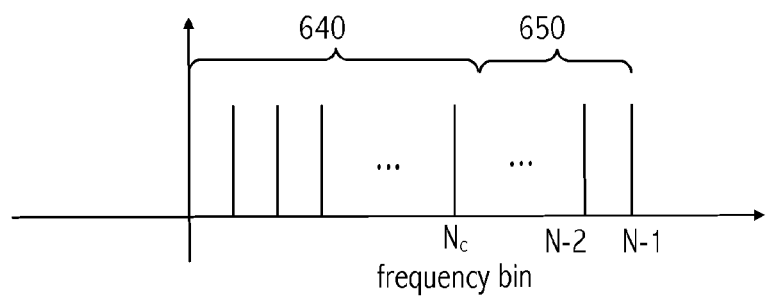
FIG. 5B illustrates an exemplary output of the filter module of FIG. 5A consistent with at least one embodiment of the invention.

Referring back to FIGS. 3A-3E, in at least one embodiment, communications unit 300 implements OFDM modulation. An exemplary demodulator consistent with an OFDM modulation protocol (FIGS. 5A and 5B) converts a baseband analog signal into a digital, time-domain signal. A fast Fourier transform module (e.g., FFT 502) demodulates the digital data by converting the digital, time domain signal into a digital, frequency domain signal (e.g., using a 128-point FFT). The frequency domain signal includes N frequency bins, a portion of which are in-band frequency bins used to encode data (e.g., frequency bins 0, 1, ... $N_k$) and at least one frequency bin used as a guard band (e.g., frequency bins N-2 and N-1). Receiver 303 recovers data from the in-band frequency bins. Note that in OFDM implementations, the filtering functions of in-band filter 326 and out-of-band filter 328 can be realized by providing digital data from in-band frequency bins (e.g., digital data 640 encoded in frequency bins 0, 1, ... $f_1$) from FFT 502 as the in-band signal and providing the digital data from guard band frequency bins (e.g., digital data 650 encoded in frequency bins N-2 and N-1) as the out-of-band signal to gain controller 330 of FIGS. 3A-3E. In at least one embodiment of receiver 303, a separate in-band filter 326 and a separate out-of-band filter 328 are not included. Gain controller 330 determines the amount of power of the baseband signal that is inside the target channel based on one or more frequency bins of the in-band signal provided by the FFT and generates an indicator of the amount of signal power at a frequency adjacent to the target channel based on one or more of the out-of-band frequency bins provided by the FFT.

Figure 6:
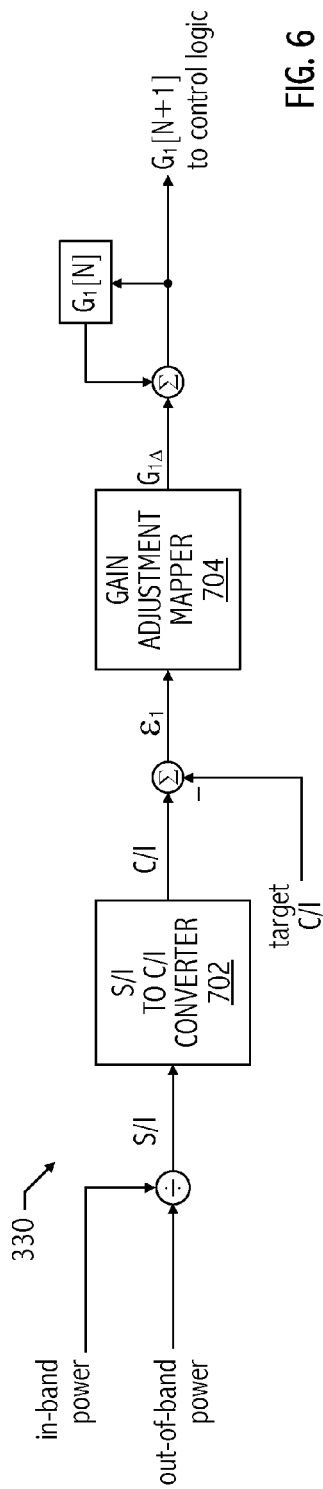
FIG. 6 illustrates a functional block diagram of a portion of gain controller 330 of FIG. 3 consistent with at least one embodiment of the invention.

Referring back to FIGS. 3A-3E, in at least one embodiment of communications unit 300, a control module (e.g., gain controller 330) uses the estimates of in-band power level and out-of-band power level to generate a C/I ratio for the output transmit signal. Since a ratio is being used, this technique does not require knowledge of the gain between the output of power amplifier 106 and filters 326 and 328. In at least one embodiment, gain controller 330 compares the C/I ratio to a target value and generates one or more control signals to adjust the transmit signal power level based on the comparison. Referring to FIG. 6, in at least one embodiment, gain controller 330 divides an in-band power level by an out-of-band power level to generate a signal-to-interference (S/I) ratio. In at least one embodiment of gain controller 330, a conversion module (e.g., S/I to C/I converter 702) converts that S/I ratio to a carrier-to-interference (C/I) ratio (e.g., using a look-up table or other suitable conversion technique). In at least one embodiment, gain controller 330 then compares the C/I to a predetermined C/I level, which is the minimum C/I level that is compliant with a target communications standard. In at least one embodiment of gain controller 330, the predetermined C/I level varies with changes to the modulation scheme implemented by modulator 102 and may be determined from a look-up table stored in a storage device or determined using any other suitable technique. In at least one embodiment of gain controller 330, the comparison is made by subtracting the predetermined C/I from the measured C/I to generate an error signal (e.g., $\epsilon_1$). In at least one embodiment, gain controller 330 includes a gain adjustment generator module (e.g., gain adjustment mapper 704) that generates a gain adjustment (e.g., $G_{1A}$) based on the error signal, for example, by mapping the error value to an appropriate change in gain. In at least one embodiment, gain controller 330 multiplies the error value by a transmitter characteristic multiplier (e.g., power amplifier characteristic, c, which is a constant that may be determined during manufacturing or during an initialization sequence). That is, $G_1[N+1]=G_1[N]+G_{1A}=G_1[N]+(\epsilon_1 \times c)$. Note that generation of a gain value based on the C/I ratio does not require knowledge of current transmitter or receiver path gains.

Figure 7:
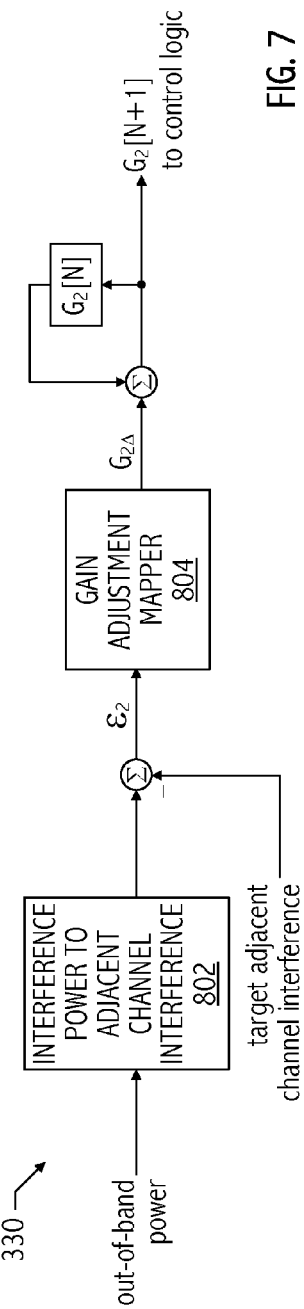
FIG. 7 illustrates a functional block diagram of a portion of gain controller 330 of FIG. 3 consistent with at least one embodiment of the invention.

Referring to FIG. 7, in at least one embodiment of gain controller 300, a conversion module (e.g., interference power to adjacent channel interference converter 802) converts the out-of-band power level into an adjacent channel interference level, e.g., using a look-up table, extrapolation, or other suitable technique. In at least one embodiment, converter 802 makes that conversion based on the gain of the loop to create an absolute power estimate. The gain of the loop may be determined during manufacturing, initialization using any suitable technique. In at least one embodiment, gain controller 330 then compares the adjacent channel interference level to a predetermined adjacent channel interference level that is a maximum adjacent channel interference level that is compliant with a target communications standard. In at least one embodiment of gain controller 330, the comparison is made by subtracting the predetermined adjacent channel interference level from the estimated adjacent channel interference level to generate an error signal (e.g., $\epsilon_2$). In at least one embodiment, gain controller 330 includes a gain adjustment generator module (e.g., gain adjustment mapper 804) that generates a gain adjustment (e.g., $G_{2A}$) based on the error signal, for example, by mapping the error value to an appropriate change in gain. In at least one embodiment, gain controller 330 multiplies the error value by a transmitter characteristic multiplier (e.g., power amplifier characteristic c). In at least one embodiment, gain controller 330 combines the gain adjustment with a current value of the gain (e.g., $G_2[N]$) to generate a next gain value (e.g., $G_2[N+1]$). That is, $G_2[N+1]=G_2[N]+G_{2A}=G_2[N]+(\epsilon_2 \times c)$.

Figure 8:
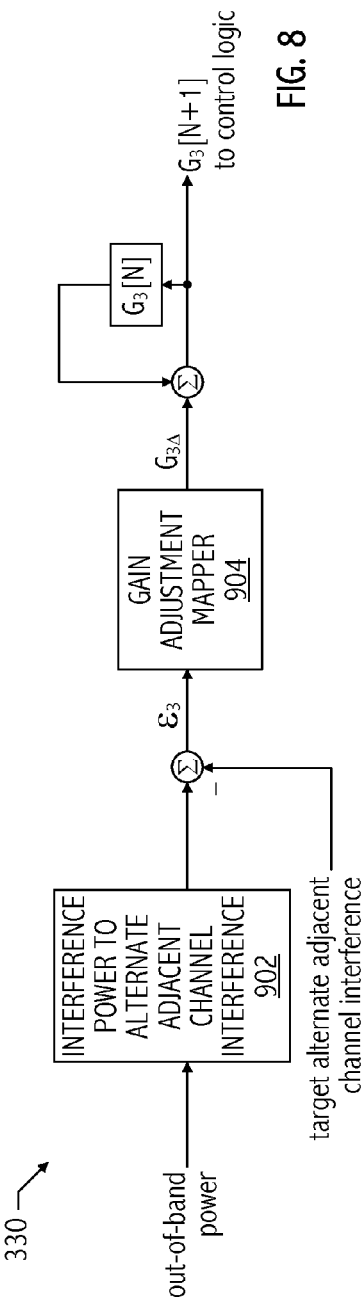
FIG. 8 illustrates a functional block diagram of a portion of gain controller 330 of FIG. 3 consistent with at least one embodiment of the invention.

Referring to FIG. 8, in at least one embodiment of gain controller 300, a conversion module converts (e.g., interference power to alternate adjacent channel interference converter 902) the out-of-band power level into an alternate adjacent channel interference level, e.g., using a look-up table, extrapolation, or other suitable technique. In at least one embodiment, converter 902 makes that conversion based on the gain of the loop to create an absolute power estimate. The gain of the loop may be determined during manufacturing, initialization using any suitable technique.

In at least one embodiment, gain controller 330 then compares the alternate adjacent channel interference level to a predetermined alternate adjacent channel interference level that is a maximum alternate adjacent channel interference level that is compliant with the target communications standard. In at least one embodiment of gain controller 330, the comparison is made by subtracting the predetermined alternate adjacent channel interference level from the estimated alternate adjacent channel interference level to generate an error signal (e.g., $\epsilon_3$). In at least one embodiment, gain controller 330 includes a gain adjustment generator module (e.g., gain adjustment mapper 904) that generates a gain adjustment (e.g., $G_{3A}$) based on the error signal, for example, by mapping the error value to an appropriate change in gain. In at least one embodiment, gain controller 330 multiplies the error value by a transmitter characteristic multiplier (e.g., power amplifier characteristic c). In at least one embodiment, gain controller 300 combines the gain adjustment with a current value of the gain (e.g., $G_3[N]$) to generate a next gain value (e.g., $G_3[N+1]$). That is, $G_3[N+1]=G_3[N]+G_{3A}=G_3[N]+(\epsilon_3 \times c)$.

Figure 9:
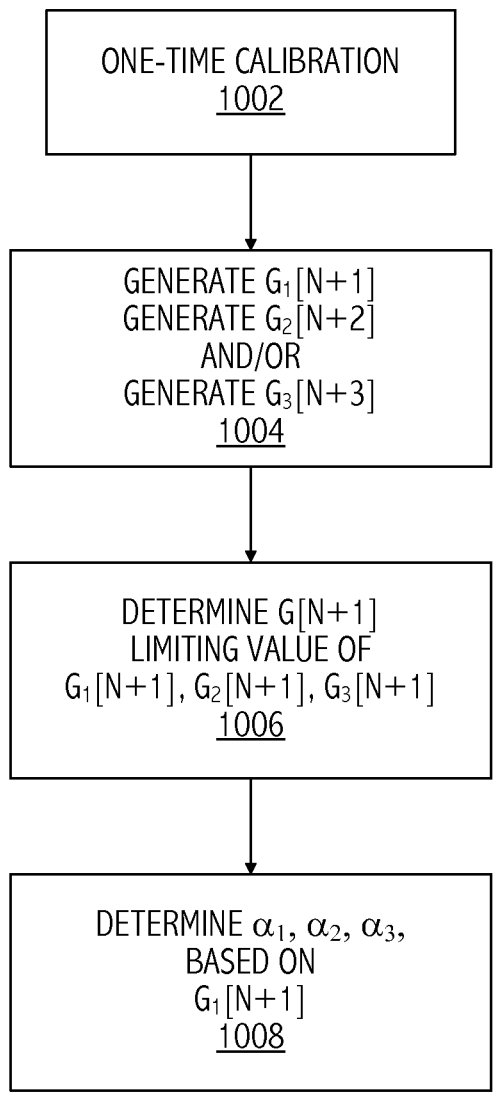
FIG. 9 illustrates information and control flows for the gain controller 330 of FIG. 3 consistent with at least one embodiment of the invention.

Various embodiments of gain controller 330 generate one or more gains $\alpha_1$, $\alpha_2$, and $\alpha_3$ of FIG. 3 based on one or more of next gain values $G_1[N+1]$, $G_2[N+1]$, and $G_3[N+1]$. Referring to FIG. 9, in at least one embodiment, gain controller 330 performs a one-time calibration, e.g., to determine the absolute power of the transmit path that is used by gain controller 330 to generate $G_2[N+1]$ and $G_3[N+1]$, as described above (1002). This one-time calibration may be performed during manufacturing using any suitable technique. Gain controller 330 generates one or more gain values (e.g., one or more of $G_1[N+1]$, $G_2[N+1]$, and $G_3[N+1]$) according to the applicable requirements of a target communications standard (1004). For example, satisfying a predetermined C/I ratio may be the only applicable requirement of a target standard in an embodiment of communications unit 300, and one or more of the gain values $\alpha_1$, $\alpha_2$, and $\alpha_3$ are based on only $G_1[N+1]$. However, in other embodiments of communications unit 300, the target standard requires satisfying a predetermined C/I ratio, a predetermined adjacent channel interference level, and an alternate adjacent channel interference level. In those embodiments of communications unit 300 that require satisfying multiple requirements of a target standard, gain controller 330 determines the maximum gain that satisfies each of the applicable requirements (e.g., $G[N+1]=\max\{G_1[N+1], G_2[N+1], G_3[N+1]\}$, for example, such that an estimated C/I ratio is greater than any predetermined level, the estimated adjacent channel interference is less than any predetermined adjacent channel interference level, and the estimated alternate adjacent channel interference is less than any predetermined alternate adjacent channel interference level) (1006). In at least one embodiment, gain controller 330 uses the value of $G[N+1]$ as the gain factor applied to the transmitter (e.g., one of $\alpha_1$, $\alpha_2$, and $\alpha_3$) (1008). In at least one embodiment, communications unit 300 uses multiple gains and gain controller 330 determines those values to introduce a maximum gain of $G[N+1]$.

In at least one embodiment, gain controller 330 is an application-specific circuit designed to perform the functions described above. In at least one embodiment, gain controller 330 is implemented using a general purpose processing circuit configured to execute instructions encoded in a computer-readable storage medium. In at least one embodiment, gain controller 330 is a combination of application-specific circuits and a general purpose processor configured to execute instructions encoded in a computer-readable storage medium. In at least one embodiment, gain controller 330 generates control signals that adjust the transmit power level to achieve a maximum transmit power level that results in a minimum acceptable C/I ratio.

In various embodiments of communications unit 300, the transmit power level is adjusted at different nodes of the transmitter by various techniques. The adjustment may be made digitally and/or through analog techniques in any of modulator 102, TX RF mixer 104, or power amplifier 106. In at least one embodiment, communications unit 300 adjusts the transmitter gain at the output of modulator 102 (e.g., applying gain $\alpha_1$ to the output of modulator 102 using multiplier 320). In at least one embodiment, communications unit 300 adjusts the transmitter gain at the TX RF mixer 104 (e.g., applying gain $\alpha_2$ to the output of TX RF mixer 104 using multiplier 340). In at least one embodiment, communications unit 300 adjusts the transmitter gain at the output of power amplifier 106 (e.g., applying gain $\alpha_3$ to the output of power amplifier 106 using multiplier 350). In at least one embodiment, gain controller 330 adjusts the transmitter gain at a combination of locations in the transmit path (e.g., by applying gains $\alpha_1$, $\alpha_2$, and $\alpha_3$ to the output of modulator 102, the output of TX RF mixer 104, and the output of power amplifier 106, respectively). In at least one embodiment, gain controller 330 adjusts one or more of gains $\alpha_1$, $\alpha_2$, and $\alpha_3$ to achieve an output transmit signal having a power level less than the maximum output power that satisfies the applicable criteria by a relatively small amount of margin (e.g., less than 5 dB) to generate a transmit output signal having an actual C/I ratio above the predetermined value.

Figure 3C:
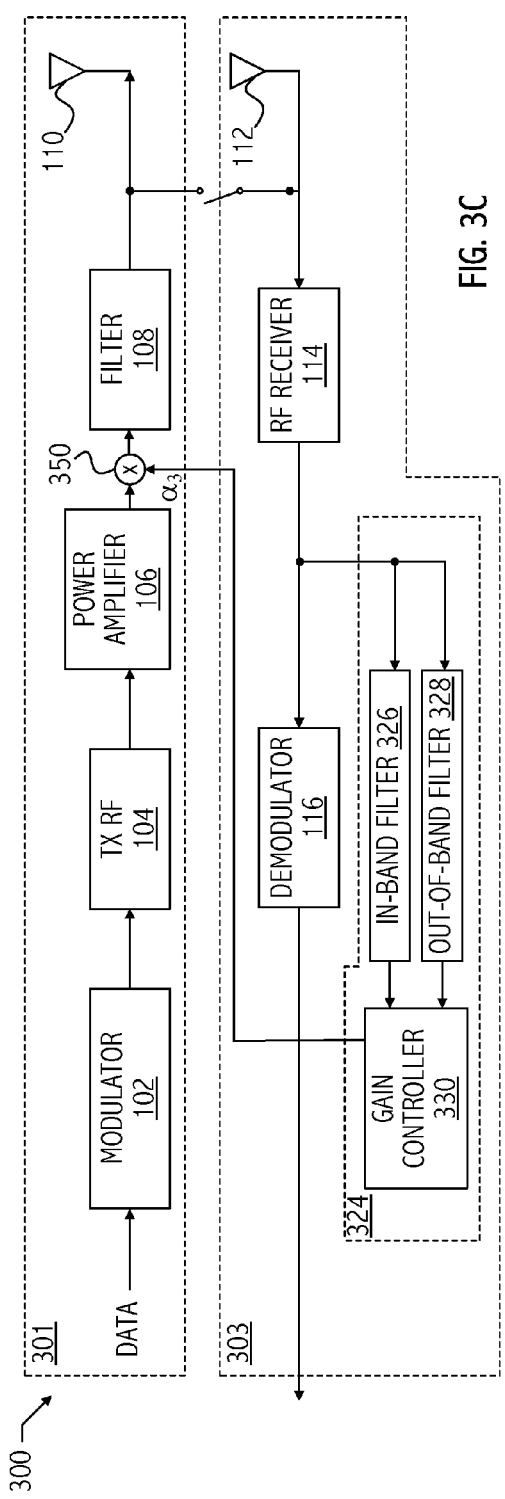
Figure 3D:
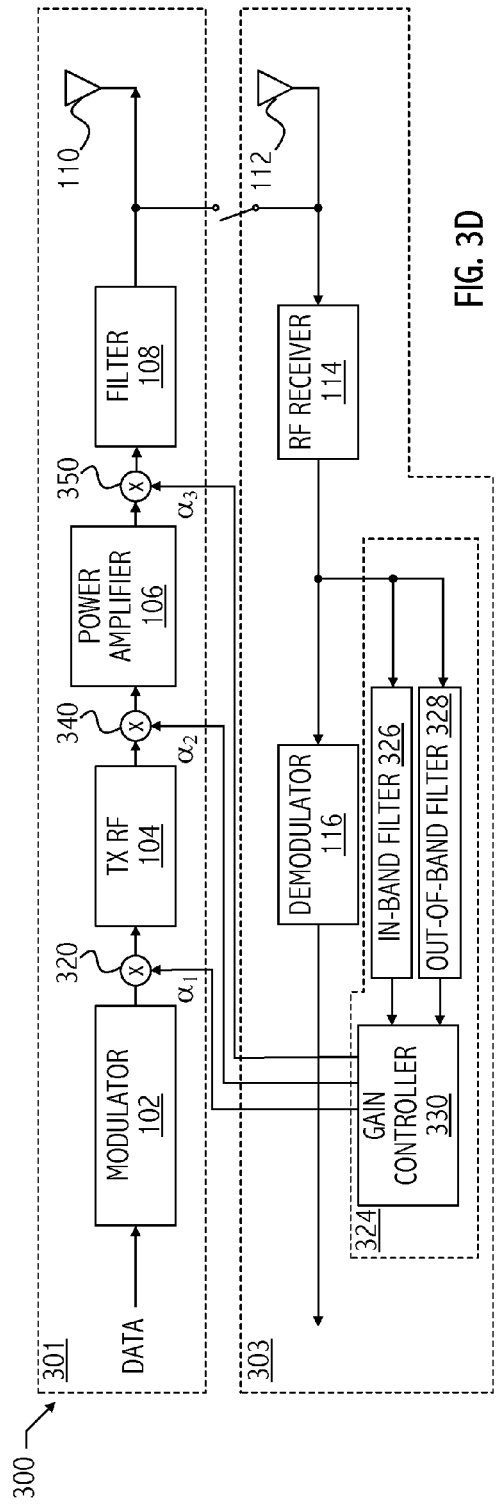
Figure 3E:
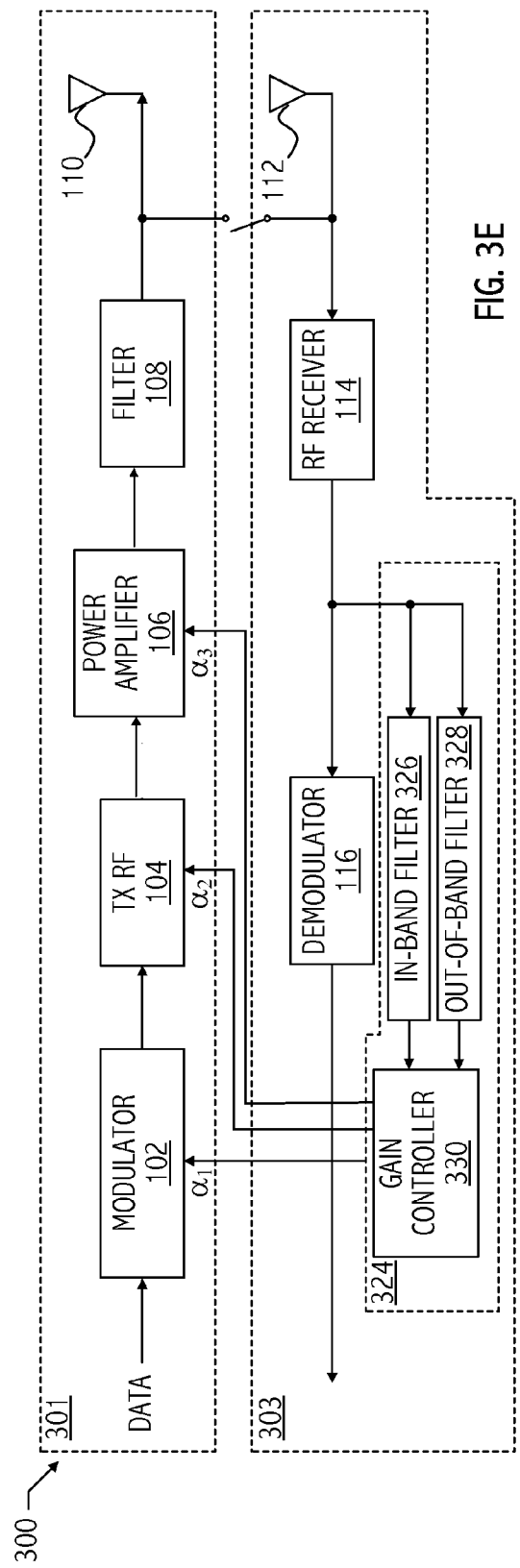
Figure 4:
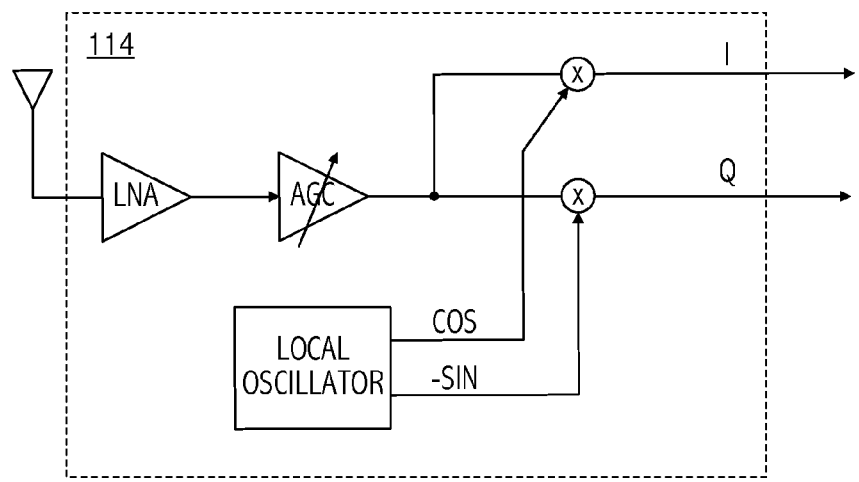
FIG. 4 illustrates a functional block diagram of radio-frequency receiver modules consistent with at least one embodiment of the invention.
Figure 10A:
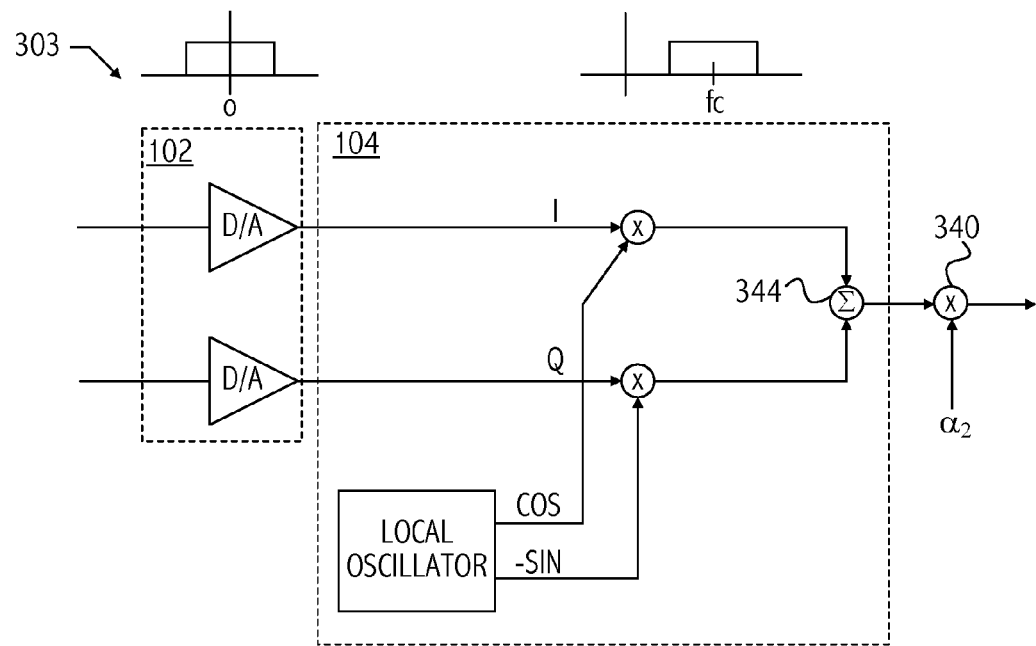
FIGS. 10A and 10B illustrate functional block diagrams of radio-frequency transmitter modules configured for dynamic transmitter power calibration consistent with various embodiments of the invention.
Figure 10B:
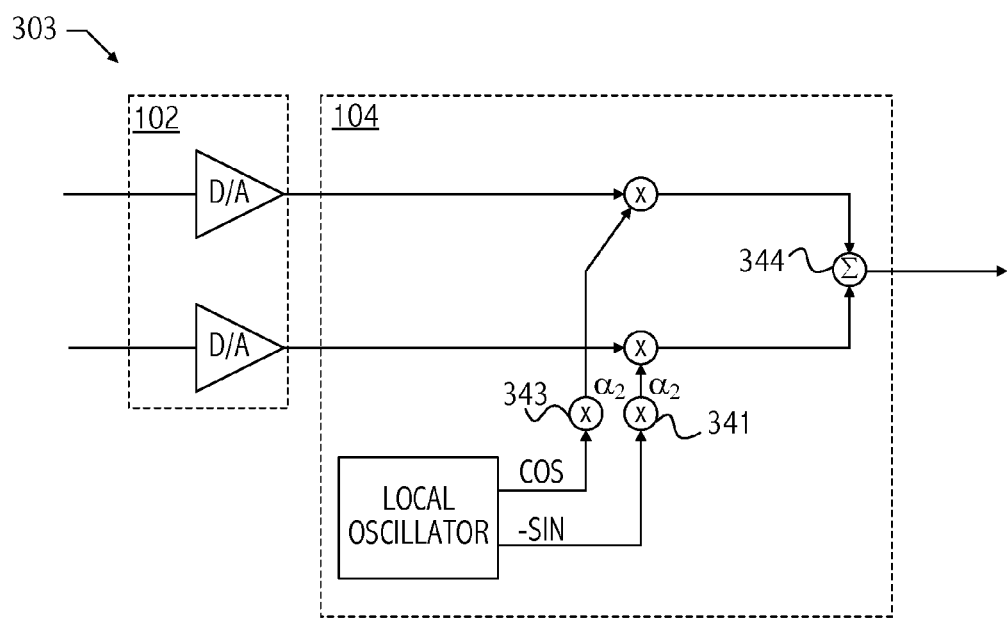

Although FIGS. 3A-3D illustrate application of gains $\alpha_1$, $\alpha_2$, and $\alpha_3$ at the outputs of modulator 102, TX RF mixer 104, and power amplifier 106, respectively, other embodiments of communications unit 300 apply one or more of those gains at corresponding nodes internal to modulator 102, TX RF mixer 104, and/or power amplifier 106 (FIG. 3E). Referring to FIGS. 3A-3E, in at least one embodiment of communications unit 300, $\alpha_1$ and $\alpha_2$ are digital gains that are applied to the signal prior to digital-to-analog conversion. In at least one embodiment of communications unit 300, digital-to-analog conversion of the signal is performed internal to modulator 102. However, other embodiments of communications unit 300 perform the digital-to-analog conversion at other nodes of communications unit 300, e.g., at the input of TX RF mixer 104, at the output of TX RF mixer 104, or at the input of power amplifier 106. Referring to FIG. 10A, in at least one embodiment of communications unit 300, multiplier 340 applies analog gain $\alpha_2$ to the output of TX RF mixer 104. In at least one embodiment of communications unit 300, TX RF mixer 104 applies analog gain $\alpha_2$ to one or more nodes internal to TX RF mixer 104. For example, referring to FIG. 10B, multipliers 341 and 343 apply an analog gain $\alpha_2$ prior to the complex multiply of the analog output of modulator 102 with the RF carrier signal. In at least one embodiment, TX RF mixer 104, applies analog gain $\alpha_2$ to the output of the complex multiply, prior to summing node 344. Note that in other embodiments of an RF mixer, analog gain $\alpha_2$ may be applied at other nodes. Thus techniques described herein apply dynamic transmitter calibration of the transmit path that results in the transmitter operating at or near a peak output power level while complying with specified limitations on distortion.

Structures described herein may be implemented using software executing on a processor (which includes firmware) or by a combination of software and hardware. Software, as described herein, may be encoded in at least one tangible computer-readable medium. As referred to herein, a tangible computer-readable medium includes at least a disk, tape, or other magnetic, optical, or electronic storage medium.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment in which a communications unit generates a single spatial stream, one of skill in the art will appreciate that the teachings herein can be utilized with communications units generating multiple spatial streams (e.g., MIMO systems). Although the invention has been described with reference to wireless communications of radio frequency transmitters (e.g., transmitters that propagate signals over the air using signal frequencies in the range of 3 kHz to 300 GHz), techniques described herein apply to signals having other frequencies and propagation over other media (e.g., communications over twisted pair or coaxial cable). Variations and modifications of the embodiments disclosed herein, may be made based on the description set forth herein, without departing from the scope and spirit of the invention as set forth in the following claims.

What is claimed is:

1. A method comprising:
   generating an indicator of interference introduced by a transmitter into a spectrum of an output transmit signal prior to transmission over a transmission medium, the indicator being generated based on the output transmit signal prior to transmission; and
   adjusting a power level of the output transmit signal prior to transmission based on the indicator and a predetermined interference indicator level,
   wherein generating the indicator comprises:
   generating an out-of-band energy estimate of energy outside a target frequency band of the output transmit signal prior to transmission;
   generating an in-band energy estimate of energy inside the target frequency band in the output transmit signal prior to transmission; and
   generating the indicator based on the out-of-band energy estimate and the in-band energy estimate, the indicator indicating a carrier-to-interference (C/I) ratio of the output transmit signal prior to transmission.

2. The method, as recited in claim 1, wherein the output transmit signal prior to transmission is based on a radio-frequency output of a power amplifier of the transmitter prior to transmission over the transmission medium and the generating the indicator comprises:

feeding back the output transmit signal prior to transmission, the feeding back providing the output transmit signal from the transmitter of a communications unit to a receiver of the communications unit; and generating a baseband version of the output transmit signal prior to transmission.

3. The method, as recited in claim 1, wherein the adjusting comprises setting the power level of the output transmit signal prior to transmission to a maximum power level that maintains the C/I ratio of the output transmit signal prior to transmission above the predetermined interference indicator level.

4. The method, as recited in claim 1, further comprising: generating an indicator of adjacent channel interference, wherein the adjusting comprises setting the power level of the output transmit signal prior to transmission to a maximum power level that maintains the C/I ratio of the output transmit signal prior to transmission above the predetermined interference indicator level and maintains the indicator of adjacent channel interference below a second predetermined interference indicator level.

5. The method, as recited in claim 1, wherein the adjusting comprises increasing a gain of the transmitter to a maximum gain that maintains alternate adjacent channel interference below the predetermined interference indicator level.

6. The method, as recited in claim 1, wherein adjusting the power of the transmit signal comprises adjusting a gain of the transmitter based on one or more of a predetermined transmitter characteristic constant, a predetermined carrier-to-interference ratio, a predetermined adjacent channel interference level, and a predetermined alternate adjacent channel interference level.

7. The method, as recited in claim 1, wherein adjusting the power of the transmit signal comprises adjusting each gain of at least two of a power amplifier gain, an RF mixer gain, and a modulator gain of the transmitter and the adjusting includes determining a maximum gain of the transmitter that satisfies one or more of a predetermined carrier-to-interference ratio, a maximum adjacent channel interference level, and a maximum alternate adjacent channel interference level.

8. The method, as recited in claim 1, wherein adjusting the power of the transmit signal comprises adjusting a gain of the transmitter based on a current value of the gain of the transmitter and a predetermined transmitter characteristic constant.

9. A method comprising:

generating an indicator of interference introduced by a transmitter into a spectrum of an output transmit signal prior to transmission over a transmission medium, the indicator being generated based on the output transmit signal prior to transmission; and adjusting a power level of the output transmit signal prior to transmission based on the indicator and a predetermined interference indicator level, wherein generating the indicator comprises:

filtering a version of the output transmit signal prior to transmission by a first filter to generate an in-band signal;

filtering a version of the output transmit signal prior to transmission by a second filter to generate an out-of-band signal; and generating the indicator based on the in-band signal and the out-of-band signal, the indicator indicating a carrier-to-interference (C/I) ratio of the output transmit signal prior to transmission.

10. The method, as recited in claim 9, wherein the out-of-band signal is based on energy at a guard band frequency of the output transmit signal prior to transmission.

11. The method, as recited in claim 9, wherein the output transmit signal prior to transmission is based on a radio-frequency output of a power amplifier of the transmitter prior to transmission over the transmission medium and the generating the indicator comprises:

feeding back the output transmit signal prior to transmission, the feeding back providing the output transmit signal from the transmitter of a communications unit to a receiver of the communications unit; and generating a baseband version of the output transmit signal prior to transmission.

12. The method, as recited in claim 9, wherein the adjusting comprises setting the power level of the output transmit signal prior to transmission to a maximum power level that maintains the C/I ratio of the output transmit signal prior to transmission above the predetermined interference indicator level.

13. The method, as recited in claim 9, further comprising: generating an indicator of adjacent channel interference, wherein the adjusting comprises setting the power level of the output transmit signal prior to transmission to a maximum power level that maintains the C/I ratio of the output transmit signal prior to transmission above the predetermined interference indicator level and maintains the indicator of adjacent channel interference below a second predetermined interference indicator level.

14. A method comprising:

generating an indicator of interference introduced by a transmitter into a spectrum of an output transmit signal prior to transmission over a transmission medium, the indicator being generated based on the output transmit signal prior to transmission; and adjusting a power level of the output transmit signal prior to transmission based on the indicator and a predetermined interference indicator level, wherein the indicator indicates a carrier-to-interference (C/I) ratio of the output transmit signal prior to transmission and the method further comprises:

generating a second indicator of interference based on the output transmit signal prior to transmission, wherein adjusting the power level comprises adjusting the power level of the output transmit signal prior to transmission to be a maximum power that maintains the indicator of interference above the predetermined interference indicator level and maintains the second indicator of interference below a second predetermined interference indicator level, the indicator of interference being independent of transmitter gain and the second indicator of interference being dependent on transmitter gain.

15. The method, as recited in claim 14, wherein generating the indicator comprises:

generating an out-of-band energy estimate of energy outside a target frequency band of the output transmit signal prior to transmission, wherein the indicator is further based on the out-of-band energy estimate and a gain of the transmitter.

16. The method, as recited in claim 14, wherein generating the indicator of interference comprises:

generating an out-of-band energy estimate of energy outside a target frequency band of the output transmit signal prior to transmission;

generating an in-band energy estimate of energy inside the target frequency band of the output transmit signal prior to transmission; and generating the indicator based on the out-of-band energy estimate and the in-band energy estimate.

17. An apparatus comprising:

an error signal generator configured to generate an indicator of interference introduced by a transmitter into a spectrum of an output transmit signal prior to transmission over a transmission medium, the indicator being generated based on the output transmit signal prior to transmission; and control logic configured to provide a transmitter gain control signal to the transmitter to adjust a power level of the output transmit signal prior to transmission based on the indicator and a predetermined interference indicator level, wherein the error signal generator comprises:

an in-band filter responsive to a version of the output transmit signal prior to transmission and configured to generate an in-band signal;

an out-of-band filter responsive to a version of the output transmit signal prior to transmission and configured to generate an out-of-band signal; and a circuit configured to generate the indicator based on the in-band signal and the out-of-band signal, the indicator indicating a carrier-to-interference (C/I) ratio of the output transmit signal prior to transmission.

18. The apparatus, as recited in claim 17, wherein the error signal generator comprises:

a filter module configured to generate an indicator of an out-of-band power level of the output transmit signal prior to transmission, and wherein the control logic comprises a gain control module configured to generate the transmitter gain control signal based on the out-of-band power level indicator and the predetermined interference indicator level.

19. The apparatus, as recited in claim 18, wherein the filter module comprises an in-band filter and an out-of-band filter configured to generate the out-of-band power level indicator based on a baseband version of the output transmit signal prior to transmission.

20. The apparatus, as recited in claim 18, wherein the gain control module comprises;

a conversion module configured to provide an interference level based on the indicator of the out-of-band power level;

an error generation module configured to compare the interference level to the predetermined interference indicator level and generate an error signal indicative of the comparison; and a gain adjustment module configured to generate the transmitter gain control signal based on the error signal.

21. The apparatus, as recited in claim 18, wherein the filter module implements a Fourier transform of a baseband version of the output transmit signal prior to transmission.

22. The apparatus, as recited in claim 18, further comprising:

a radio-frequency receiver configured to generate a baseband version of the output transmit signal prior to transmission; and a feedback path configured to feed back the output transmit signal, the feedback path coupling the transmitter to a radio-frequency receiver.

23. The apparatus, as recited in claim 18, wherein the transmitter gain control signal includes a gain control signal for at least two of a power amplifier of the transmitter, a radio-frequency converter of the transmitter, or a modulator of the transmitter.

24. The apparatus, as recited in claim 18, wherein the gain control signal has a level that sets a power level of the output transmit signal prior to transmission to a maximum power level that maintains a carrier-to-interference ratio of the output transmit signal prior to transmission above the predetermined interference indicator level.

25. The apparatus, as recited in claim 18, wherein the gain control signal has a level that sets a power level of the output transmit signal prior to transmission to be a maximum power that maintains a carrier-to-interference ratio of the output transmit signal prior to transmission above the predetermined interference indicator level and maintains adjacent channel interference below a second predetermined interference indicator level.

26. The apparatus, as recited in claim 18, further comprising:

a transmitter comprising:

a modulator configured to modulate a baseband signal using digital data;

a radio-frequency signal converter configured to convert the baseband signal to a radio-frequency signal; and a power amplifier configured to amplify the radio-frequency signal to generate the output transmit signal prior to transmission, wherein a gain of the transmitter is adjustable in response to the transmitter gain control signal.

27. The apparatus, as recited in claim 17, wherein the transmitter gain control signal is generated to have a level that sets the power level of the output transmit signal prior to transmission to a maximum power level that maintains a carrier- to-interference ratio of the output transmit signal prior to transmission above the predetermined interference indicator level.

28. The apparatus, as recited in claim 17, wherein the transmitter gain control signal is generated to have a level that sets the power level of the output transmit signal prior to transmission to a maximum power level that maintains a carrier-to-interference ratio of the output transmit signal prior to transmission above the predetermined interference indicator level and maintains adjacent channel interference of the output transmit signal prior to transmission below a second predetermined interference indicator value.

29. The apparatus, as recited in claim 17, wherein the transmitter gain control signal controls at least two gains of a power amplifier gain, an RF mixer gain, and a modulator gain of the transmitter and is determined based on a maximum gain of the transmitter that satisfies one or more of a predetermined carrier-to-interference ratio, a maximum adjacent channel interference level, and a maximum alternate adjacent channel interference level.

30. The apparatus, as recited in claim 17, wherein a gain of the transmitter is adjusted based on a current value of the gain of the transmitter and a predetermined power amplifier characteristic constant.

* * * * *

UNITED STATES PATENT AND TRADEMARK OFFICE
CERTIFICATE OF CORRECTION

PATENT NO. : 9,655,069 B2  
APPLICATION NO. : 13/228547  
DATED : May 16, 2017  
INVENTOR(S) : James Robert Kelton et al.

Page 1 of 1

It is certified that error appears in the above-identified patent and that said Letters Patent is hereby corrected as shown below:

In the Claims

In Column 10, Line 59, please replace "in" with --of--.

Signed and Sealed this  
Twenty-seventh Day of June, 2017

Joseph Matal  
*Performing the Functions and Duties of the*  
*Under Secretary of Commerce for Intellectual Property and*  
*Director of the United States Patent and Trademark Office*